UNITED STATES PATENT OFFICE.

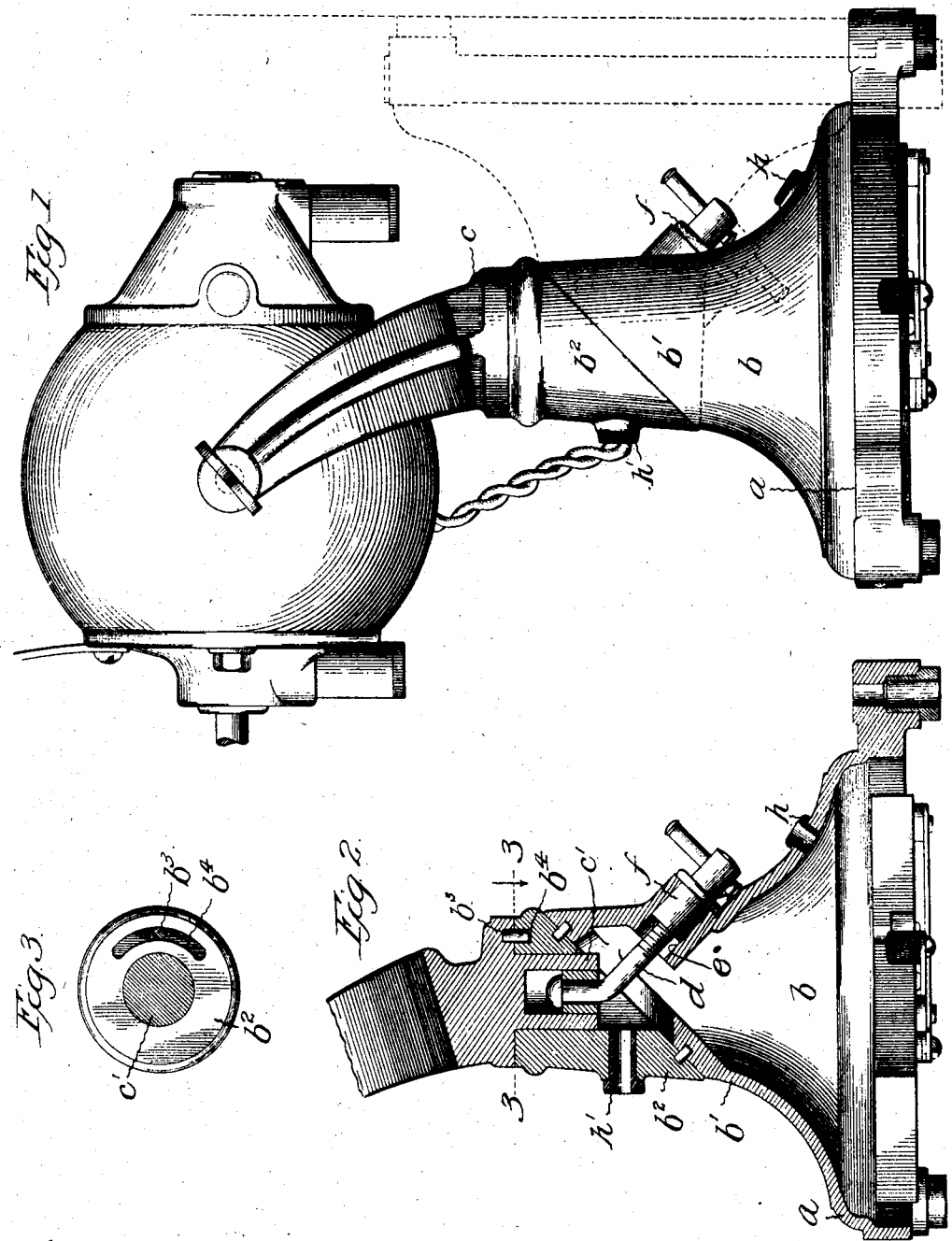

HAROLD R. WELLMAN, OF CHICAGO, ILLINOIS, ASSIGNOR TO WESTERN ELECTRIC COMPANY, OF CHICAGO, ILLINOIS, A CORPORATION OF ILLINOIS.

FAN-MOTOR SUPPORT.

No. 834,695.   Specification of Letters Patent.   Patented Oct. 30, 1906.

Application filed April 22, 1905. Serial No. 256,862.

*To all whom it may concern:*

Be it known that I, HAROLD R. WELLMAN, a citizen of the United States, residing at Chicago, in the county of Cook and State of Illinois, have invented a certain new and useful Improvement in Fan-Motor Supports, of which the following is a full, clear, concise, and exact description.

My invention relates to a support or standard for fan-motors, and has for its object to provide an improved support which may be conveniently employed either as a desk-stand or a wall-bracket.

I will describe my invention more particularly by reference to the accompanying drawings, which illustrate the preferred embodiment of my invention, reserving for the appended claims a statement of the parts which I deem novel with me.

Figure 1 is a view in side elevation of a fan-motor support embodying my invention and employed as a desk-stand, the alternative arrangement of parts to form a wall-bracket being illustrated in dotted lines. Fig. 2 is a vertical sectional view of the support, and Fig. 3 is a cross-sectional view on line 3 3 of Fig. 2.

The same letters of reference designate the same parts wherever they are shown.

The base $a$ of the support is preferably circular and hollow to permit the mounting of the usual switching mechanism therein and carries a stem $b$, upon which is mounted a motor-supporting member $c$.

The stem $b$, which is preferably a hollow cylinder, comprises two parts $b'$ $b^2$, united by a miter-joint, one of said parts $b'$ being secured to the base and preferably formed integrally therewith, the other part $b^2$ of said stem being adjustable and adapted to be alternatively attached to the fixed part $b'$ of the stem by means of said miter-joint to lie in alinement with said part or at an angle thereto, said adjustable part forming a mounting for the supporting member $c$. In other words, the ends of the parts $b'$ $b^2$ are cut away and adapted to fit together to cause said parts to lie in alinement with each other or at right angles to each other. Dowel-pins may be carried by one of the stem parts $b'$ $b^2$ and enter holes in the other stem part to maintain said parts in proper relation to each other in either position of the part $b^2$. When the parts of the stem lie in alinement with each other, the stem may be employed as a desk-stand, as illustrated in full lines in Fig. 1, and when it is desired to use the same as a wall-bracket the parts may be caused to occupy an angular position with relation to each other, as shown in dotted lines in Fig. 1.

I provide means for uniting the several parts in either position of said adjustable stem part $b^2$. The supporting member $c$, which is preferably bifurcated, as shown, is mounted upon the adjustable stem part $b^2$, a portion of the base $c'$ of said member fitting within the opening in the stem part $b^2$ and carrying a bolt, which is adapted to enter an opening $e$ in the wall of the stationary stem part $b'$, a nut $f$ being adapted to be applied to said bolt from the exterior of the stem through the opening $e$ therein. The said bolt is connected with base $c'$ of the motor-supporting member by means of a swivel-joint and is bent so as to enter opening $e$ in the stationary stem part regardless of the position of the adjustable stem portion $b^2$.

The motor-supporting member $c$ is adjustably mounted upon the adjustable stem part $b^2$, being partially rotatable thereon. To this end I may provide a groove $b^4$, extending partly around the top of the stem part $b^2$, in which a pin $b^3$, carried by the base of the supporting member $c$, is adapted to ride. This groove may be made of any required length to give the range of adjustment that may be desired. When the nut $f$ is tightened, the supporting member $c$ will be bound firmly against the top of the adjustable stem part $b^2$ and locked in its adjusted position.

The usual openings $h$ $h'$ in the base and stem, respectively, may be provided for the entry of conducting-wires to the switching mechanism supported with the base, and the base may be provided with supporting-legs of varying length to prevent tilting of the support by the weight of the motor when said support is employed as a desk-stand.

I claim—

1. In a fan-motor support, the combination with a base, of a stem carried thereby and comprising two parts adapted to be connected with each other by a miter-joint to assume a position in alinement with each other or at right angles to each other, a motor-supporting member mounted upon the outer part of said stem and partially rotatable thereon for adjustment, and means for simultaneously securing said parts together in either position of said stem and for locking said member in its adjusted position.

2. In a fan-motor support, the combination with a base, of a hollow stem comprising two parts connected by a miter-joint, one of said parts being fixed to said base, the other part of said stem being adapted to be connected with said stationary part by means of said miter-joint to lie in alinement with said stationary part, or at an angle thereto, a motor-carrying member fitting within the opening in the adjustable part of said stem, a bolt secured to said motor-carrying member and passing within the parts of said stem, and means for securing said bolt to the stationary portion of the stem in either position of the adjustable part thereof.

3. In a fan-motor support, the combination with a base, of a hollow stem comprising two parts connected by a miter-joint, one of said parts being fixed to said base, the other part being adapted to be attached to said stationary part to lie in alinement therewith or at an angle thereto, a motor-supporting member projecting within said adjustable stem portion and partially rotatable thereon to adjust the position of the motor, a bolt secured to said motor-carrying member by a swivel-joint, said bolt passing within said stem, and adapted in either position of the adjustable part to enter an opening in the wall of the stationary stem part, and a nut adapted to be applied to said bolt through said opening, to bind said parts together and lock said supporting member in its adjusted position.

4. In a motor-support, the combination with a base, of a stem secured to said base and comprising two parts united by a miter-joint, the adjustable part of said stem being adapted to be connected to the stationary part of the stem to lie in alinement with said stationary part or at an angle thereto, a bifurcated motor-supporting member, the base whereof fits within said adjustable stem portion, a pin and groove therefor carried by said last-mentioned parts to permit partial rotation of said supporting member for adjustment, a bolt secured to the base of said member by a swivel-joint, said bolt passing through said adjustable stem part and adapted to enter an opening in the stationary stem part in either position of said adjustable stem part, and a nut adapted to be applied to said bolt through said opening.

5. In a fan-motor support, the combination with a hollow circular metal base, of switching mechanism mounted within said base, a hollow cylindrical stem comprising two parts united by a miter-joint, one of said parts being formed integrally with said base, the other part being adapted to be connected with said stationary part by means of said joint to lie in alinement therewith or at right angles thereto, a bifurcated motor-supporting member, the base whereof fits within said adjustable stem part, said member being partially rotatable upon said adjustable stem part for adjustment, and means for binding said parts together in either position of the adjustable stem part for locking said supporting member in its adjusted position.

6. In a fan-motor support, the combination with a base, of a hollow stem secured thereto, and comprising two parts adapted to be connected to each other to assume positions in alinement with or at right angles to each other, a motor-supporting member upon the outer part of the stem and partially rotatable thereon for adjustment, and a bolt within the stem having a swivel connection with said motor-supporting member and adapted to connect said stem parts in either position thereof, and to lock said motor-supporting member in its adjusted position.

7. In a fan-motor support, the combination with a base, of a hollow stem comprising two parts connected by a miter-joint, one of said parts being fixed to the base, the other part being adapted to be attached to said stationary part to lie in alinement therewith or at an angle thereto, an adjustable motor-supporting member carried by said adjustable stem part, a bent bolt secured to said supporting member by a swivel-joint, said bolt passing within said stem, into an opening in the wall of the stationary stem part extending to the outside thereof, and a nut adapted to be applied to said bolt through said opening, whereby all the parts are clamped in adjusted position.

In witness whereof I hereunto subscribe my name this 11th day of March, A. D. 1905.

HAROLD R. WELLMAN.

Witnesses:
 R. T. ALLOWAY,
 E. F. BEAUBIEN.